No. 607,631. Patented July 19, 1898.
E. H. STALEY.
STEAM HEATER AND COOKER.
(Application filed Mar. 7, 1898.)
(No Model.)
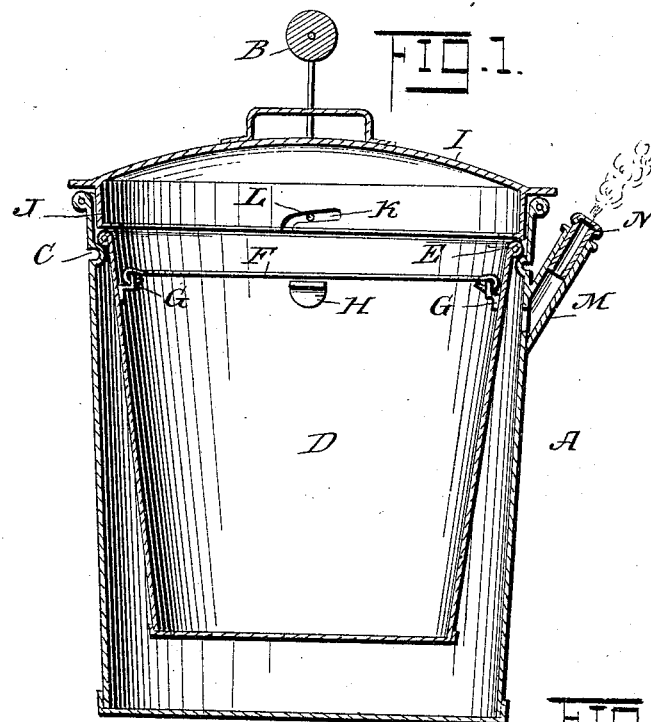
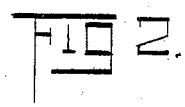
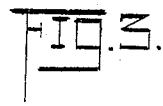
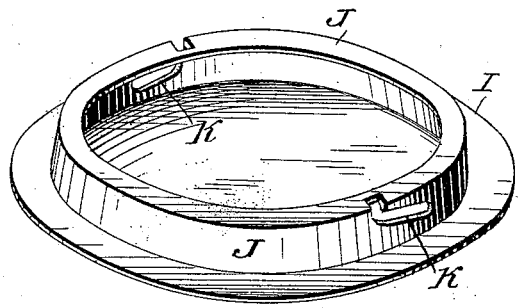
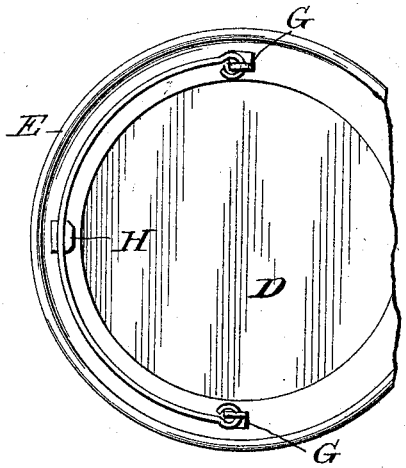
Witnesses
Sam R. Turner
R. S. Caldwell
Inventor
Edwin H. Staley
By R. S. & A. B. Lacey
Attorneys

UNITED STATES PATENT OFFICE.

EDWIN H. STALEY, OF BURT, IOWA.

STEAM HEATER AND COOKER.

SPECIFICATION forming part of Letters Patent No. 607,631, dated July 19, 1898.

Application filed March 7, 1898. Serial No. 672,903. (No model.)

*To all whom it may concern:*

Be it known that I, EDWIN H. STALEY, a citizen of the United States, residing at Burt, in the county of Kossuth and State of Iowa, have invented certain new and useful Improvements in Steam Heaters and Cookers; and I do hereby declare the following to be a full, clear, and exact description of the invention, such as will enable others skilled in the art to which it appertains to make and use the same.

My invention relates to certain new and useful improvements in steam-cookers, and has for its object to produce a device which will heat milk or the like to a high temperature without the danger of scorching.

With these and other objects in view my invention consists in the novel details of construction and combination of parts to be fully described in the following specification and clearly set forth in the appended claim.

Referring to the accompanying drawings, forming part of this specification, in which like letters of reference indicate like parts, Figure 1 is a central vertical section of my invention. Fig. 2 is a perspective view of the cover inverted, and Fig. 3 is a plan view of the inner vessel.

A represents an outer vessel formed of sheet metal with a bail and handle B for convenience in lifting. A short distance below the upper edge of the vessel A the sides are indented to form an internal annular flange C, on which is supported an inner vessel D by means of its outturned rim E. A wire bail F is secured to the inner vessel D by engaging its hooked ends into ears G, secured within the said inner vessel at a short distance below its edge, and this bail is normally supported by an angular rest H on the side of the vessel D, as shown. A cover I has a downwardly-projecting annular band J, which fits closely the sides of the vessel A and is turned inward at right angles at its lower edge. This band J rests on the rim of the inner vessel and has slanting slots K formed therein to engage pins L, which project within the vessel A. A spout M is connected to the outer vessel and contains a removable nozzle N, through which the steam generated in the vessel A escapes.

My invention just described is particularly adapted for use by dairymen who find it necessary in winter to heat the milk which is fed to the young calves. Heretofore the main difficulty in this practice has been that the milk, if not constantly attended to, would scorch and make the calves sick, often resulting in death; but with my device this is obviated, since the milk, which is contained in the inner vessel, is surrounded by water in the outer vessel and therefore cannot be heated to a temperature greater than the boiling-point of water, (212° Fahrenheit,) which is perfectly safe for the milk.

It will be seen that with the construction I use there is no danger of the milk slopping over into the outer vessel in handling, because of the band J, which, besides holding the vessel against displacement, turns the splashing milk back into it, and there is no possibility of the cover becoming accidentally disconnected, for the pins L hold it securely.

It is obvious that changes in the form, proportion, and minor details of construction may be made within the scope of the invention without departing from the spirit or sacrificing any of the advantages thereof.

Having thus fully described my invention, what I claim as new, and desire to secure by Letters Patent, is—

In a steam-cooker, the combination of an outer containing vessel provided below its rim edge with inwardly-projecting pins and below said pins with an annular indentation forming an inturned bead or flange, an inner vessel having an outturned rim at its upper end resting on said bead, ears located therein below the bead and an angular rest located substantially in the plane of said ears, a bail-handle pivoted to the ears and adapted to be supported by said rest, and a cover for the outer vessel provided with a band having at its lower end an inturned flange or portion adapted to rest upon the bead of the inner vessel and prevent the contents thereof from slopping thereover, and bayonet slots to engage the pins on the outer vessel, the angular terminal ends of said slots being extended into said inturned flange of the cover-band, substantially as described.

In testimony whereof I affix my signature in presence of two witnesses.

EDWIN H. STALEY.

Witnesses:
JOSEPH SINK,
C. H. BLOSSOM.